United States Patent
Gatchalian et al.

(10) Patent No.: US 12,231,466 B2
(45) Date of Patent: Feb. 18, 2025

(54) PRIVATE CLOUD INFRASTRUCTURE STITCHING PROCESS AND ORCHESTRATION

(71) Applicant: Bank of America Corporation, Charlotte, NC (US)

(72) Inventors: Gilbert Gatchalian, Union, NJ (US); Brian Christman, Richardson, TX (US); Kamal D. Sharma, Mason, OH (US); Karthik A. Rajagopalan, Richmond, VA (US); Kevin A. Delson, Woodland Hills, CA (US); Yassine Touahri, Charlotte, NC (US); Amer Ali, Jersey City, NJ (US); Robert R. Rosseland, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 252 days.

(21) Appl. No.: 17/978,274

(22) Filed: Nov. 1, 2022

(65) Prior Publication Data
US 2024/0146765 A1     May 2, 2024

(51) Int. Cl.
*H04L 9/40*     (2022.01)
(52) U.S. Cl.
CPC .................... *H04L 63/164* (2013.01)
(58) Field of Classification Search
CPC ........................................... H04L 63/164
See application file for complete search history.

(56) References Cited

U.S. PATENT DOCUMENTS

2024/0028418 A1 *  1/2024  Walsh ................. G06F 9/4875

FOREIGN PATENT DOCUMENTS

WO    WO-2020219862 A1 *  10/2020  ........... G06F 16/958

OTHER PUBLICATIONS

Johann (Kief Morris on Infrastructure as Code, IEEE Software 2017 (Year: 2017).*

* cited by examiner

*Primary Examiner* — Brian F Shaw
(74) *Attorney, Agent, or Firm* — Weiss & Arons LLP (57) ABSTRACT

Provided is a system for orchestration of a mainframe computing environment. The system may include a mainframe. The system may include components such as a computer processor, a controller, a computing layer, a storage layer, and a network layer. The computer processor may run on the mainframe. The computer processor may utilize an application programming interface (API) to stitch the mainframe with the computing layer, the storage layer, and the network layer. An infrastructure as code (IaC) format may stitch together the components of the system. The computer processor may use the controller to utilize the IaC format to orchestrate the mainframe computing environment. The computer processor may optimize the utilization of the mainframe computing environment.

13 Claims, 5 Drawing Sheets

PRIVATE CLOUD INFRASTRUCTURE STITCHING PROCESS AND ORCHESTRATION

FIELD OF TECHNOLOGY

Aspects of the disclosure relate to private cloud computing. Specifically, aspects of the disclosure relate to stitching mainframe systems into a private cloud computing environment.

BACKGROUND OF THE DISCLOSURE

Many companies, organizations, and industries rely on mainframes. Some use mainframes due to large investments years ago in what are now legacy systems that have yet to be decommissioned due to cost and other obstacles. Others use mainframes because the mainframes remain the best solution for their enterprise's computational needs. In both cases, enterprises continue to channel resources into their mainframes to keep them compatible with other computational capabilities in the enterprise.

Some industries that continue to rely upon mainframes include banking, healthcare, government, retail, insurance, and aviation. Some commonalities among these industries include high volume, large amounts of data, security, reliability, and regulation. Projections for use of mainframes in these industries continue well into the future.

While some companies and organizations modernize their computational systems by completely overhauling and purchasing new mainframes, many others look for a hybrid approach where they modernize the old systems in-place. There is a need for a creative solution for keeping a legacy mainframe-based system integrated with newly emerging computational technologies.

SUMMARY OF THE DISCLOSURE

Apparatus and methods are herein provided to meet the above outlined objects of the invention.

Provided are methods for orchestration of a private cloud computing environment. A computer processor may perform the methods. A computing layer may perform the methods.

Methods may include using a computer processor to utilize an application programming interface (API) for stitching a computing layer, a storage layer, a network layer, and a mainframe into an infrastructure as code (IaC) format. Methods may include using a computer processor to operate a controller for utilizing the IaC format to orchestrate the private cloud computing environment. Methods may include using a computer processor to optimize the utilization of the private cloud computing environment.

Methods may further include where optimizing the utilization of the private cloud computing environment involves orchestrating a distribution of workloads from one or more of the computing layer, the storage layer, the network layer, and the mainframe that is operating at full capacity to one or more of the computing layer, the storage layer, the network layer, and the mainframe that is operating at a capacity less than full capacity.

Methods may further include where optimizing the utilization of the private cloud computing environment involves orchestrating a distribution of workloads from one or more of the computing layer, the storage layer, the network layer, and the mainframe that is operating at a capacity more than idle to one or more of the computing layer, the storage layer, the network layer, and the mainframe that is idle.

Methods may further include where the mainframe is a legacy mainframe. A legacy mainframe may be a mainframe that is not natively integrated into the IaC format. The legacy mainframe may be a mainframe that is unable to be stitched without the IaC format. The legacy mainframe may obtain an IaC format through being stitched to components in the private cloud computing environment.

Methods may further include where the mainframe contains one or more of the computing layer, the storage layer, the network layer, the controller, and the mainframe.

Methods may further include where, as part of the optimization of the utilization of the private cloud computing environment, the computer processor sends workloads to another private cloud computing environment.

Methods may further include where the computer processor operates within the computing layer. Methods may further include where the computer processor operates independently of the computing layer.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which.

DETAILED DESCRIPTION OF THE DISCLOSURE

Aspects of the disclosure relate to an apparatus and methods for meeting the objects of the invention.

Apparatus may include a system for orchestration of a private cloud computing environment. A private cloud computing environment, or private cloud, may also be an internal cloud, a corporate cloud, or a private internal network. A private cloud may be offered over the Internet to a select group of users. A private cloud may be a private network internal to an organization. A private cloud may provide an ability to customize and control how the computing environment is setup and operates. A private cloud may offer enhanced levels of privacy and security as compared to a public cloud.

The system may contain a computer processor. The system may contain a computing layer. The private cloud computing environment may contain the computer processor. The private cloud computing environment may contain the computing layer. The computer processor may operate within the computing layer. The computer processor may operate independently of the computing layer. The computing layer may be a software and/or hardware element that contains all the computing capabilities of the private cloud computing environment. The computing layer may contain less than all the computing capabilities of the private cloud computing environment.

The system may contain a storage layer. The private cloud computing environment may contain the storage layer. The storage layer may be a software and/or hardware element that contains all the storage capacity of the private cloud computing environment. The storage layer may contain less than all the storage capacities of the private cloud computing environment. The computer processor may control the storage layer. The computing layer may control the storage layer.

The system may contain a network layer. The private cloud computing environment may contain the network layer. The network layer may be a software and/or hardware element that controls all the networking requirements of the private cloud computing environment. The network layer may control less than all the networking requirements of the private cloud computing environment. The computer processor may control the network layer. The computing layer may control the network layer.

The system may contain a controller. The private cloud computing environment may contain the controller. The controller may be a software and/or hardware element that controls all the private cloud computing environment. The controller may control part of the private cloud computing environment but not control all the private cloud computing environment. The computer processor may control the controller. The computing layer may control the controller.

The system may contain a mainframe. A mainframe computer, or mainframe, may be a central data repository of an organization. It may link to users through less powerful devices such as terminals and workstations. A mainframe may meet large processing demands for critical applications. Its use in an organization may indicate an emphasis of a centralized form of computing as compared to a distributed form of computing. Examples include large-scale transaction processing and assembling, storing and analyzing large amounts of data. A mainframe may contain computing and storage capacities. A mainframe may contain computing, storage, and networking capacities.

The private cloud computing environment may contain the mainframe. The mainframe may contain one or more of the computer processor, the computing layer, the storage layer, the network layer, and the controller. The computer processor may operate the entire mainframe. The computer processor may operate part of the mainframe but less than the entire mainframe. The computer layer may operate the entire mainframe. The computer layer may operate part of the mainframe but less than the entire mainframe.

The computer processor may utilize an application programming interface (API). The computing layer may utilize an API. An API may provide a way for multiple programs to communicate with each other. For example, an API may provide a way for two or more of the following components to communicate with each other: the computer processor, the computing layer, the storage layer, the network layer, the controller, and the mainframe. The API may provide a way for one or more programs within the private cloud computing environment to communicate with one or more programs outside of the private cloud computing environment.

The API may provide a way for efficient communication between components in the private cloud computing environment. The API may provide a way for automating workflows within the private cloud computing environment. An API specification may be a document or standard that describes the automation of workflows within the private cloud computing environment. The computer processor that meets the API specification may implement an API. The term API may refer either to the implementation of the API or to the API specification.

An API may be made up of different parts. A programmer may use the different parts as services or tools. A programmer or program may call a portion of the API when utilizing one or more of these parts. Calls that make up the API may also be referred to as requests, methods, and subroutines. An API specification may define these calls, meaning that it may explain how to use or implement them.

The computer processor may utilize the API to stitch together two or more of the computing layer, the storage layer, the network layer, and the mainframe. The computing layer may utilize the API to stitch together two or more of the computing layer, the storage layer, the network layer, and the mainframe. Stitching together two or more of the computing layer, the storage layer, the network layer, and the mainframe may refer to code that connects components into one common platform for developers and users of the private cloud to operate. In one aspect, the private cloud computing environment may contain two or more components stitched together. In another aspect, the mainframe may contain two or more components stitched together.

Stitching may facilitate movement of data such as workloads within the private cloud computing environment. Stitching may facilitate movement of data such as workloads between the private cloud computing environment and another cloud computing environment.

The computer processor may utilize an API to stitch two or more of the computing layer, the storage layer, the network layer, and the mainframe into an infrastructure as code (IaC) format. IaC may be a provisioning and managing of an organization's computational infrastructure through machine-readable files such as code instead of through physical hardware configuration, interactive configuration tools, or manual processes. The computing layer may utilize an API to stitch two or more of the computing layer, the storage layer, the network layer, and the mainframe into an IaC format.

IaC may manage and provision infrastructure of the private cloud computing environment using code. Using IaC may reduce a need for utilizing manual processes. Using IaC may eliminate a need for utilizing manual processes. IaC may create configuration files that contain infrastructure specifications. The configuration files may simplify a process of editing and distributing configurations. The configuration files may provide consistency in the private cloud computing environment. For example, configuration files may ensure provisioning of the same computing framework on the private cloud computing environment every time. Using IaC may avoid ad-hoc, undocumented configuration changes.

The computer processor may use the controller to utilize the IaC format to orchestrate the private cloud computing environment. The computing layer may use the controller to utilize the IaC format to orchestrate the private cloud computing environment. The orchestration may involve two or more of the computing layer, the storage layer, the network layer, and the mainframe.

Orchestration may include actions the controller performs in setting up devices, applications, and services in the private cloud computing environment to achieve objectives. Orchestration may include the automated configuration, management, and coordination of the private cloud computing environment to achieve objectives. Orchestration may include performing a series of related tasks to achieve a complex objective such as using a controller to execute automated tasks in a designed order and confirming successful completion of the task before proceeding to the next task.

Objectives may include maximizing available resources such as the computing layer, the storage layer, the network layer, and the mainframe. Orchestration may enable those overseeing the private cloud computing environment to manage complex tasks and workflows more easily. Orchestration may reduce a need to manually manage an allocation of resources over the private cloud computing environment.

Orchestration may provide several benefits to the private cloud computing environment. It may use the controller to translate needs of the business into computing environment requirements. It may set up private cloud computing environment to deliver on those requirements. Orchestration may monitor to ensure the fulfillment of business needs. It may synchronize two or more components of the computing environment to help achieve business objectives.

Orchestration may increase utilization of resources over the private cloud computing environment. Orchestration may optimize utilization of resources over the private cloud computing environment. The orchestration may optimize the utilization of the private cloud computing environment. The orchestration may distribute workloads from one or more of the computing layer, the storage layer, or the network layer that is operating at full capacity to one or more of the computing layer, the storage layer, or the network layer that is operating at a capacity less than full capacity. The orchestration may distribute workloads from one or more of the computing layer, the storage layer, or the network layer that is operating at a capacity more than idle to one or more of the computing layer, the storage layer, or the network layer that is idle.

The computing layer, the storage layer, or the network layer operating at a full capacity may include operating at maximum capability. The computing layer, the storage layer, or the network layer operating at a full capacity may include operating at all times within a given window of time.

For example, a bank's private cloud computing environment may utilize resources to operate a trading system during times when one or more trading exchanges are open. The bank's private cloud computing environment may utilize resources to operate a risk management system when trading exchanges are closed. The resources utilized to operate the trading system may be different than the resources utilized to operate the risk management system. Orchestration may facilitate optimal use of the private cloud computing environment to coordinate resources. For example, orchestration may use one or more of the computing layer, the storage layer, the networking layer, and the mainframe to perform one or more workloads needed for the trading system and, at a different time, the risk management system.

As part of the optimization of the private cloud computing environment, the computer processor may send workloads from one part of the computing environment to another part of the computing environment. As another part of the optimization of the private cloud computing environment, the computer processor may send workloads from the private cloud computing environment to another computing environment.

The mainframe may be a legacy mainframe. The legacy mainframe may obtain an IaC format from a computer processor stitching the mainframe to other components in the private cloud computing environment. A legacy mainframe may be a mainframe that does not natively integrate into the IaC format. Natively integrated may describe a mainframe manufactured to integrate into the IaC format. Natively integrated may describe a mainframe commissioned into use to integrate into the IaC format. The legacy mainframe may be a mainframe that is unable to be stitched without the IaC format. The mainframe may be a modern mainframe. A modern mainframe may be a mainframe that natively integrates into the IaC format.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
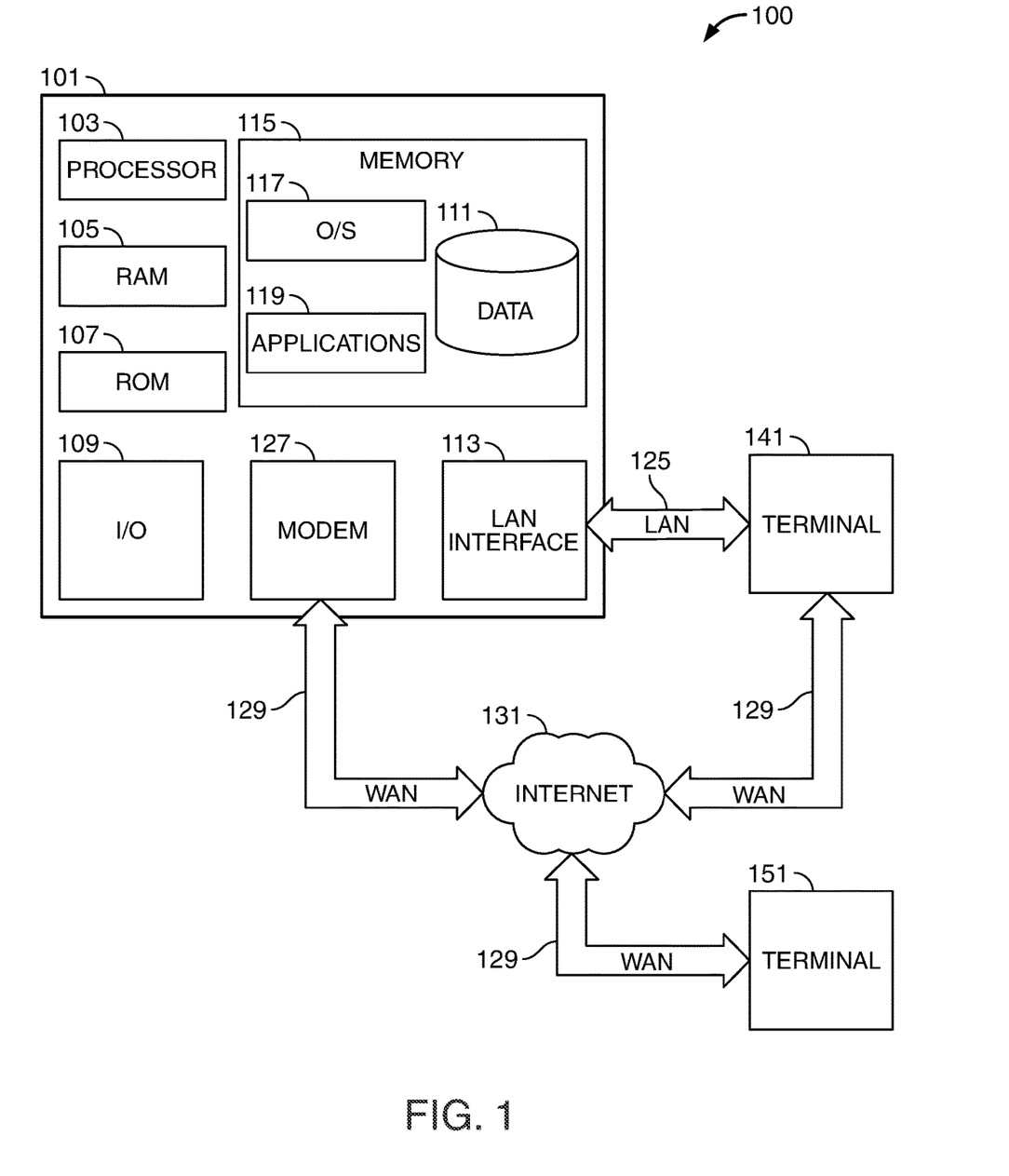
FIG. 1 is a block diagram of apparatus in accordance with principles of the disclosure.

FIG. 1 shows an illustrative block diagram of system 100 that includes computer 101. One may refer to Computer 101 as an "engine," "server" or "computing device." Computer 101 may be a workstation, mainframe, desktop, laptop, tablet, smart phone, or any other suitable computing device. One may use elements of system 100, including computer 101, to implement various aspects of the systems and methods disclosed herein.

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may be comprised of any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through I/O modules 109. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or API. One may understand that web-based, for the purposes of this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. Application program(s) 119 may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include an application programming interface (API) to stitch the computing layer, the storage layer, the network layer, and the mainframe into an infrastructure as code (IaC) format.

One may describe the invention in the context of computer-executable instructions, such as application program(s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for the purposes of this application, as engines with respect to the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
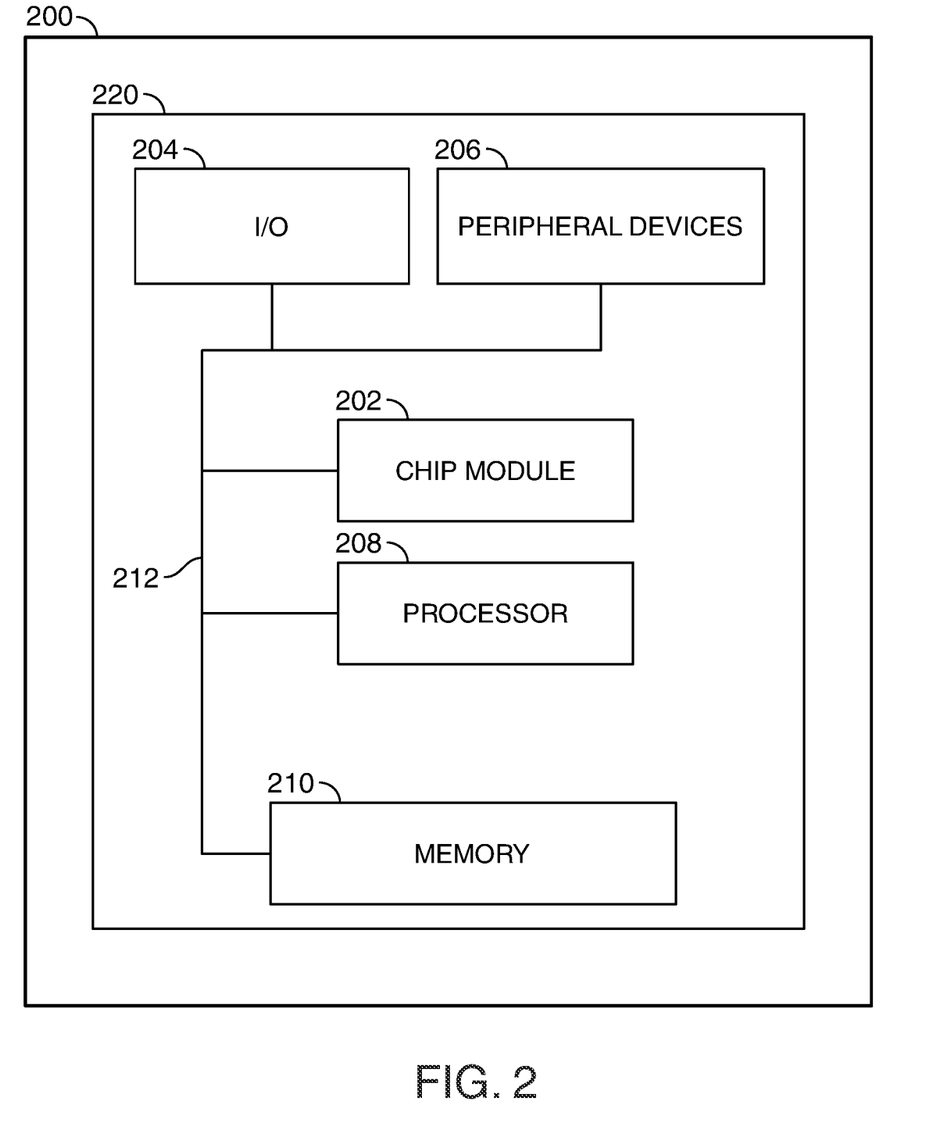
FIG. 2 is another block diagram of apparatus in accordance with principles of the disclosure.

FIG. 2 shows an illustrative block diagram of apparatus 200. One may configure apparatus 200 in accordance with the principles of the disclosure. Apparatus 200 may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; processor 208 or logical processing device, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
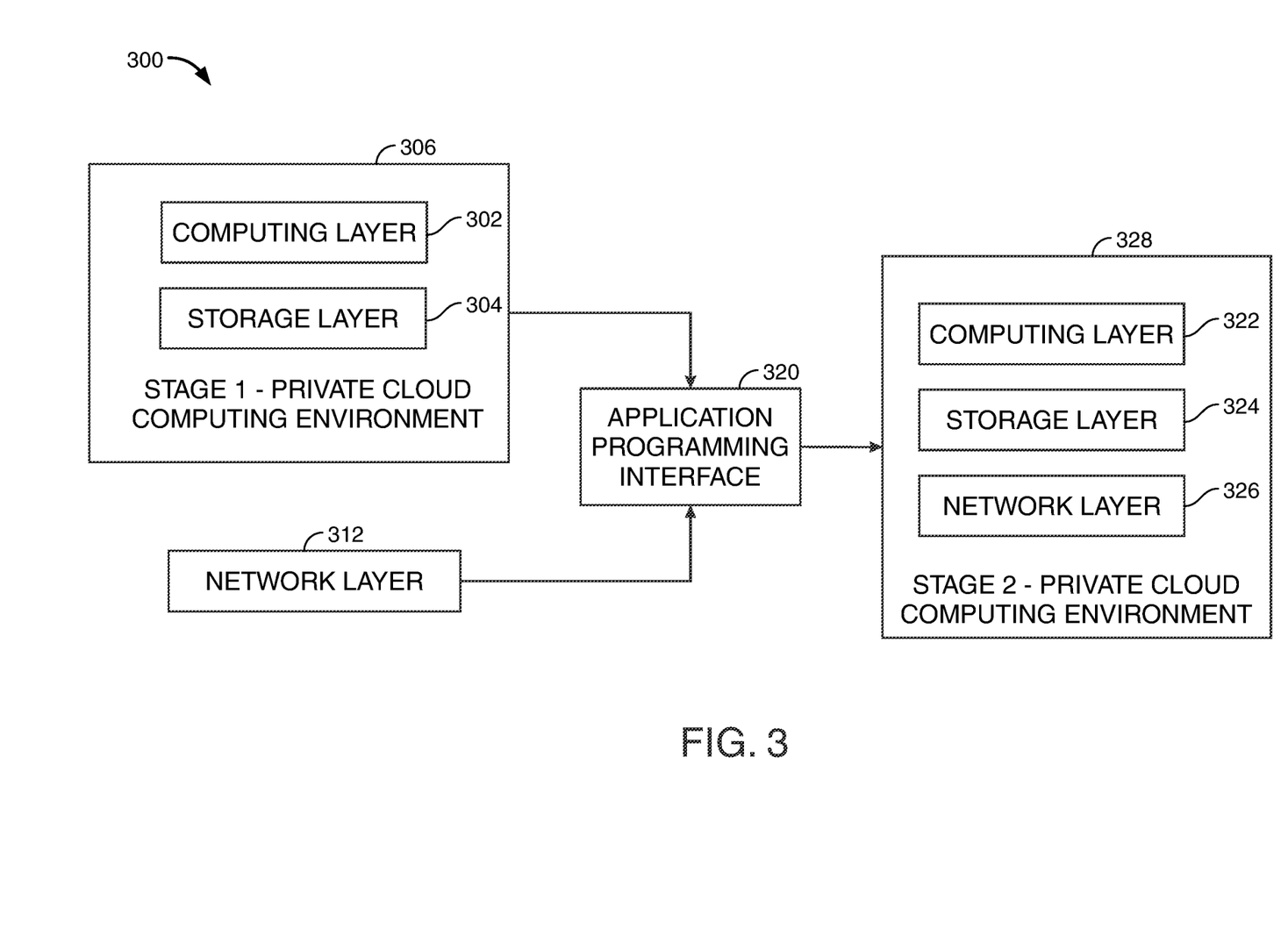
FIG. 3 is a block diagram in accordance with principles of the disclosure.

FIG. 3 shows an illustrative diagram 300 depicting a migration from stage 1 private cloud computing environment 306 and network layer 312 to stage 2 private cloud computing environment 328. Stage 1 private cloud computing environment 306 may include computing layer 302 and storage layer 304. Application programming interface (API) 320 may join, or stitch together stage 1 computing environment 306 with network layer 312 to make stage 2 private cloud computing environment 328. Infrastructure as code (IaC) may serve as the foundation of stage 2 private cloud computing environment 328. Stage 2 private cloud 328 computing environment may include computing layer 322, storage layer 324, and network layer 326. API 320 may migrate the system from stage 1 private cloud computing environment 306 to stage 2 private cloud computing environment 328 while keeping stage 1 private cloud computing environment 306 and network layer 312 infrastructure intact. API 320 may migrate the system from stage 1 private cloud computing environment 306 to stage 2 private cloud computing environment 328 while keeping stage 1 private cloud computing environment 306 and network layer 312 infrastructure operating.

Figure 4:
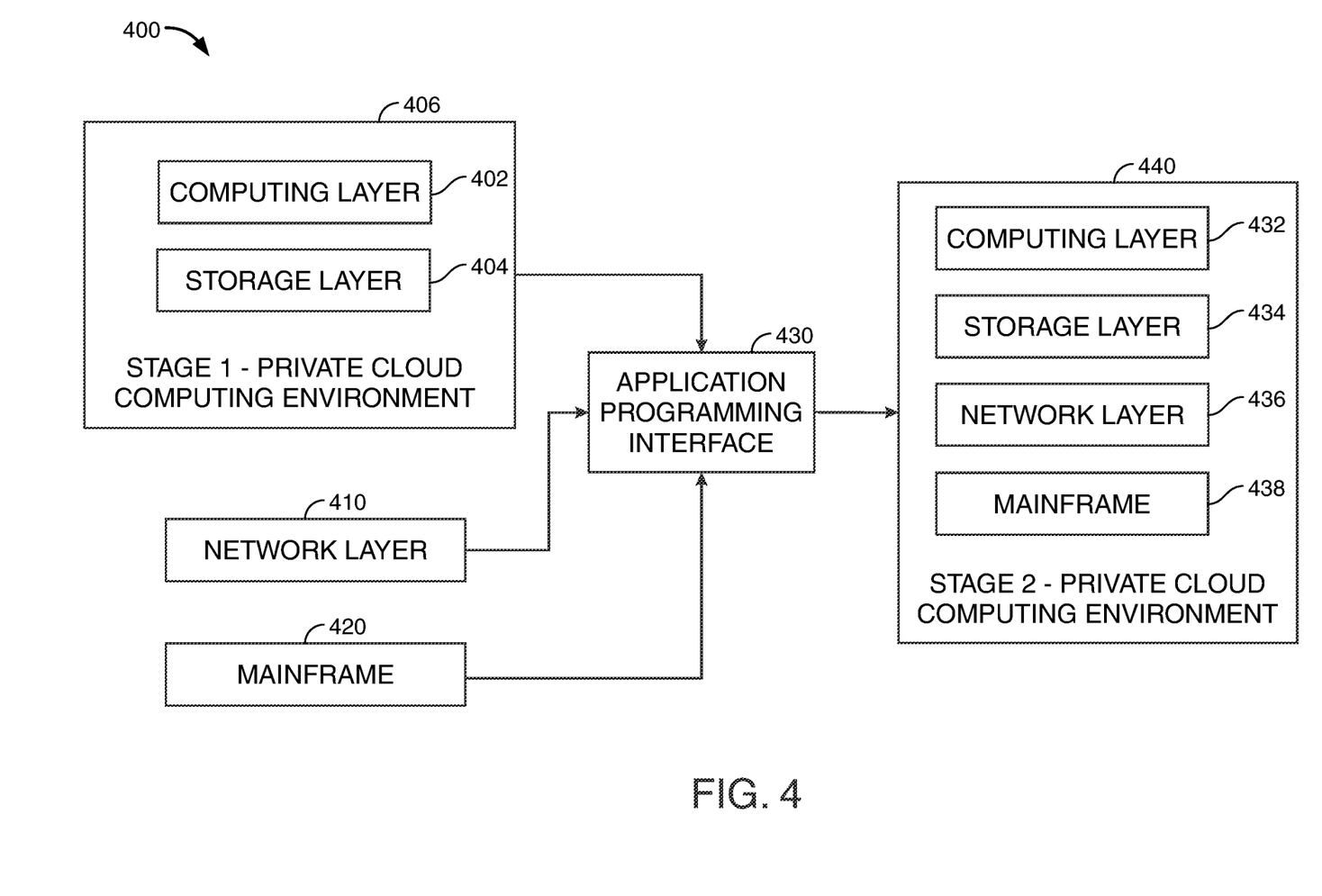
FIG. 4 is a block diagram in accordance with principles of the disclosure.

FIG. 4 shows an illustrative diagram 400 depicting a migration from stage 1 private cloud computing environment 406, network layer 410, and mainframe 420 to stage 2 private cloud computing environment 440. Stage 1 private cloud computing environment 406 may include computing layer 402 and storage layer 404. Application programming interface (API) 430 may join, or stitch together stage 1 private cloud computing environment 406 with network layer 410 to make stage 2 private cloud computing environment 440. Infrastructure as code (IaC) may serve as the foundation of stage 2 private cloud computing environment 440. Stage 2 private cloud computing environment 440 may include computing layer 432, storage layer 434, network layer 436, and mainframe 438. The API 430 may migrate the system from stage 1 private cloud 406 computing environment to stage 2 private cloud computing environment 440 while keeping stage 1 private cloud computing environment 406, network layer 410, and mainframe 420 infrastructure intact. API 430 may migrate the system from stage 1 private cloud computing environment 406 to stage 2 private cloud computing environment 440 while keeping stage 1 private cloud computing environment 406, network layer 410, and mainframe 420 infrastructure operating.

Figure 5:
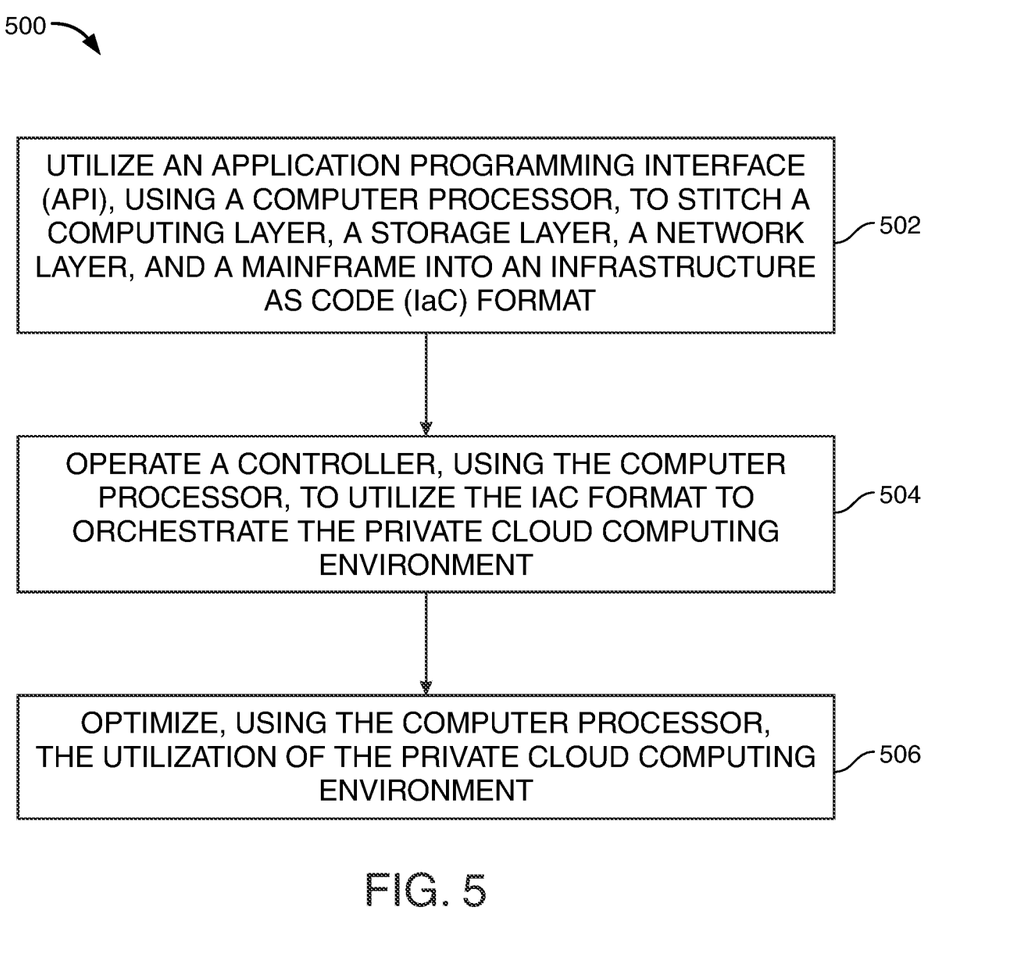
FIG. 5 is a flowchart of a process in accordance with principles of the disclosure.

FIG. 5 illustrates a flowchart 500 depicting an orchestration of a private cloud computing environment. At step 502, a computer processor may utilize an application programming interface (API) to stitch a computing layer, a storage layer, a network layer, and a mainframe into an infrastructure as code (IaC) format.

At step 504, a computer processor may operate a controller to utilize the IaC format to orchestrate the private cloud computing environment.

At step 506, the computer processor may optimize the utilization of the private cloud computing environment.

The private cloud computing environment may contain the computer processor, the controller, the computing layer, the storage layer, the network layer, and the mainframe.

The computer processor may optimize the utilization of the private cloud computing environment.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for orchestration of a private cloud computing environment are provided. Persons skilled in the art will appreciate that the present invention can be practiced by other than the described embodiments, which are presented for purposes of illustration rather than of limitation, and that the present invention is limited only by the claims that follow.

What is claimed is:

1. A system for orchestration of a private cloud computing environment, the system comprising: a computer processor located in the private cloud computing environment; a controller located in the private cloud computing environment; a computing layer located in the private cloud computing environment; a storage layer located in the private cloud computing environment; a network layer located in the private cloud computing environment; and a mainframe located in the private cloud computing environment; wherein the computer processor is configured to: utilize an application programming interface (API) to stitch the computing layer, the storage layer, the network layer, and the mainframe into an infrastructure as code (IaC) format; said mainframe is a legacy mainframe; said legacy mainframe is unable to be stitched without the IaC format; use the controller to utilize the IaC format to orchestrate the private cloud computing environment; and optimize a utilization of the private cloud computing environment by orchestrating a distribution of workloads from the mainframe that is operating at full capacity to one or more of the computing layer, the storage layer, and the network layer, operating at a capacity less than full capacity.

2. The system of claim 1, wherein optimization of the utilization of the private cloud computing environment involves orchestrating a distribution of workloads from one or more of the computing layer, the storage layer, the network layer, and the mainframe that is operating at a capacity more than idle to one or more of the computing layer, the storage layer, the network layer, and the mainframe that is idle.

3. The system of claim 1, wherein the mainframe comprises one or more of the computing layer, the storage layer, the network layer, and the controller.

4. The system of claim 1, wherein, as part of optimizing the utilization of the private cloud computing environment, the computer processor is configured to send workloads to another private cloud computing environment.

5. The system of claim 1, wherein the computer processor operates within the computing layer.

6. The system of claim 1, wherein the computer processor operates independently of the computing layer.

7. A method for orchestration of a private cloud computing environment, the method comprising: utilizing an application programming interface (API), using a computer processor, to stitch a computing layer, a storage layer, a network layer, and a mainframe into an infrastructure as code (IaC) format; operating a controller, using the computer processor, to utilize the IaC format to orchestrate the private cloud computing environment; and optimizing, using the computer processor, a utilization of the private cloud computing environment by orchestrating a distribution of workloads from the mainframe that is operating at full capacity to one or more of the computing layer, the storage layer, and the network layer, operating at a capacity less than full capacity; wherein:
 said mainframe is a legacy mainframe;
 said legacy mainframe is unable to be stitched without the IaC format;
 the computer processor, the controller, the computing layer, the storage layer, the network layer, and the mainframe are located in the private cloud computing environment.

8. The method of claim 7, wherein optimizing the utilization of the private cloud computing environment involves orchestrating a distribution of workloads from one or more of the computing layer, the storage layer, the network layer, and the mainframe that is operating at a capacity more than idle to one or more of the computing layer, the storage layer, the network layer, and the mainframe that is idle.

9. The method of claim 7, wherein the mainframe comprises one or more of the computing layer, the storage layer, the network layer, and the controller.

10. The method of claim 7, wherein, as part of the optimization of the utilization of the private cloud computing environment, the computer processor is configured to send workloads to another private cloud computing environment.

11. The method of claim 7, wherein the computer processor operates within the computing layer.

12. The method of claim 7, wherein the computer processor operates independently of the computing layer.

13. A system for orchestration of a mainframe computing environment, the system comprising: a mainframe located in the mainframe computing environment;
 a computer processor located in the mainframe computing environment;
 a controller located in the mainframe computing environment;
 a computing layer located in the mainframe computing environment;
 a storage layer located in the mainframe computing environment; and
 a network layer located in the mainframe computing environment;
 wherein the computer processor runs on the mainframe and is configured to:
  utilize an application programming interface (API) to stitch the mainframe with the computing layer, the storage layer, and the network layer into an infrastructure as code (IaC) format;
  said mainframe is a legacy mainframe;
   said legacy mainframe is unable to be stitched without the IaC format,
  use the controller to utilize the IaC format to orchestrate the mainframe computing environment; and
  optimize a utilization of the mainframe computing environment by orchestrating a distribution of workloads from the mainframe that is operating at full capacity to one or more of the computing layer, the storage layer, and the network layer, operating at a capacity less than full capacity.

\* \* \* \* \*